(12) United States Patent
Hsieh et al.

(10) Patent No.: US 8,607,100 B2
(45) Date of Patent: Dec. 10, 2013

(54) MOTHERBOARD TESTING DEVICE AND TESTING METHOD THEREOF

(75) Inventors: Yi-Tsang Hsieh, New Taipei (TW); Yung-Po Chang, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 220 days.

(21) Appl. No.: 13/340,704

(22) Filed: Dec. 30, 2011

(65) Prior Publication Data

US 2013/0073906 A1    Mar. 21, 2013

(30) Foreign Application Priority Data

Sep. 15, 2011   (TW) .............................. 100133266 A

(51) Int. Cl.
*G06F 11/00* (2006.01)

(52) U.S. Cl.
USPC ............................................. 714/42; 714/54

(58) Field of Classification Search
USPC ............ 714/42, 54, 6.1, 6.11, 6.3, 6.32, 4.11, 714/4.12, 30, 710, 718
See application file for complete search history.

(56) References Cited

U.S. PATENT DOCUMENTS

| 8,335,260 B2 * | 12/2012 | Li et al. ..................... 375/240.22 |
| 2013/0032633 A1 * | 2/2013 | Fu et al. ......................... 235/375 |

* cited by examiner

*Primary Examiner* — Dieu-Minh Le
(74) *Attorney, Agent, or Firm* — Altis Law Group, Inc.

(57) ABSTRACT

A motherboard testing device applied to a motherboard which includes two memory channels, and a CPU. Each of the two memory channels includes two memory slots. The motherboard testing device includes four memory modules received in the four memory slots, a switching chip, a microcontroller, and a testing module. The switching chip includes four input pins electrically connected to the four memory modules, four output pins electrically connected to the CPU, and a controlling pin electrically connected to the microcontroller. The microcontroller forms a plurality of combination modes of the memory slots by electrically combining the four memory slots, and controls the switching chip to electrically connect memory slots of each combination mode to the CPU. The testing module tests whether the CPU controls the memory modules received in the memory slots of each combination mode to work in proper working modes.

14 Claims, 3 Drawing Sheets

```
┌─────────────────────────────────────────────────────┐
│  Providing a motherboard testing device and a motherboard, the  │
│  motherboard testing device comprises a first memory module, a second │
│  memory module, a third memory module, a fourth memory module, a │
│  switching chip, a microcontroller, and a testing module, the    │
│  motherboard comprising a first memory channel, a second memory  │
│  channel, and a CPU, wherein the first memory channel comprises a first │
│  memory slot and a second memory slot, the second memory channel │──S01
│  comprises a third memory slot and a fourth memory slot          │
└─────────────────────────────────────────────────────┘
                          │
                          ▼
┌─────────────────────────────────────────────────────┐
│  Forming a plurality of combination modes of the memory slots by │
│  electrically combining the first memory slot, the second memory slot, │──S02
│  the third memory slot, and the fourth memory slot, and gives a serial │
│  number to each combination mode by the microcontroller          │
└─────────────────────────────────────────────────────┘
                          │
                          ▼
┌─────────────────────────────────────────────────────┐
│  Inserting the first memory module in the first memory slot, inserting the │
│  second memory module in the second memory slot, inserting the third │──S03
│  memory module in the third memory slot, and inserting the fourth │
│  memory module in the fourth memory slot                         │
└─────────────────────────────────────────────────────┘
                          │
                          ▼
┌─────────────────────────────────────────────────────┐
│  Controlling the switching chip to electrically connect the memory slots │
│  in a particular combination mode to the CPU, and to disconnect the │
│  other memory slots not in the particular combination mode from the │──S04
│  CPU according to the serial number by the microcontroller, testing │
│  whether the CPU controls each of the memory modules received in the │
│  memory slots of the particular combination mode to work at a proper │
│  working mode by the testing module                              │
└─────────────────────────────────────────────────────┘
              │                           │
              ▼                           ▼
┌──────────────────────────┐   ┌──────────────────────────┐
│ If the CPU controls the  │   │ If the CPU controls the  │
│ memory modules received  │   │ memory modules received  │
│ in the memory slots of   │   │ in the memory slots of   │
│ all of the combination   │   │ at least one combination │
│ modes to work at correct │   │ mode to work at wrong    │
│ working modes, the       │   │ working modes, the       │
│ motherboard is           │   │ motherboard is defective │
│ acceptable               │   │                          │
└──────────────────────────┘   └──────────────────────────┘
            S05                          S06
```

FIG. 2

MOTHERBOARD TESTING DEVICE AND TESTING METHOD THEREOF

BACKGROUND

1. Technical Field

The present disclosure relates to a motherboard testing device and a testing method using the motherboard testing device.

2. Description of Related Art

A motherboard includes a number of memory channels and a central processing unit (CPU). Each memory channel includes a number of memory slots for receiving memory modules. The memory slots can be combined to form a number of combination modes. Each of the memory modules has a number of working modes (such as a lockstep mode, a mirror mode, and a sparing mode) corresponding to the combination modes. The CPU controls each of the memory modules to work in a correct working mode according to a corresponding combination mode. Usually, the memory modules are inserted the memory slots included in a particular combination mode, and the motherboard is then powered on to test whether the CPU controls the memory modules to work in the correct working modes. The motherboard is then powered off. The memory modules are pulled from the memory slots, then the memory slots of another combination mode are reinserted for the next test, until all combination modes have been tested. The repeated physical actions of pulling out the memory modules and reinserting them reduces working efficiency, and golden fingers of the memory modules are very prone to be damaged.

Therefore, it is desirable to provide a motherboard testing device and a testing method using the motherboard testing device that can overcome the above-mentioned limitations.

BRIEF DESCRIPTION OF THE DRAWINGS

Many aspects of the embodiments should be better understood with reference to the drawings. The components in the drawings are not necessarily drawn to scale, the emphasis instead being placed upon clearly illustrating the principles of the present disclosure. Moreover, in the drawings, like reference numerals designate corresponding parts throughout the several views.

FIG. 2 is a flowchart of a motherboard testing method, according to a second embodiment.

DETAILED DESCRIPTION

Figure 1:
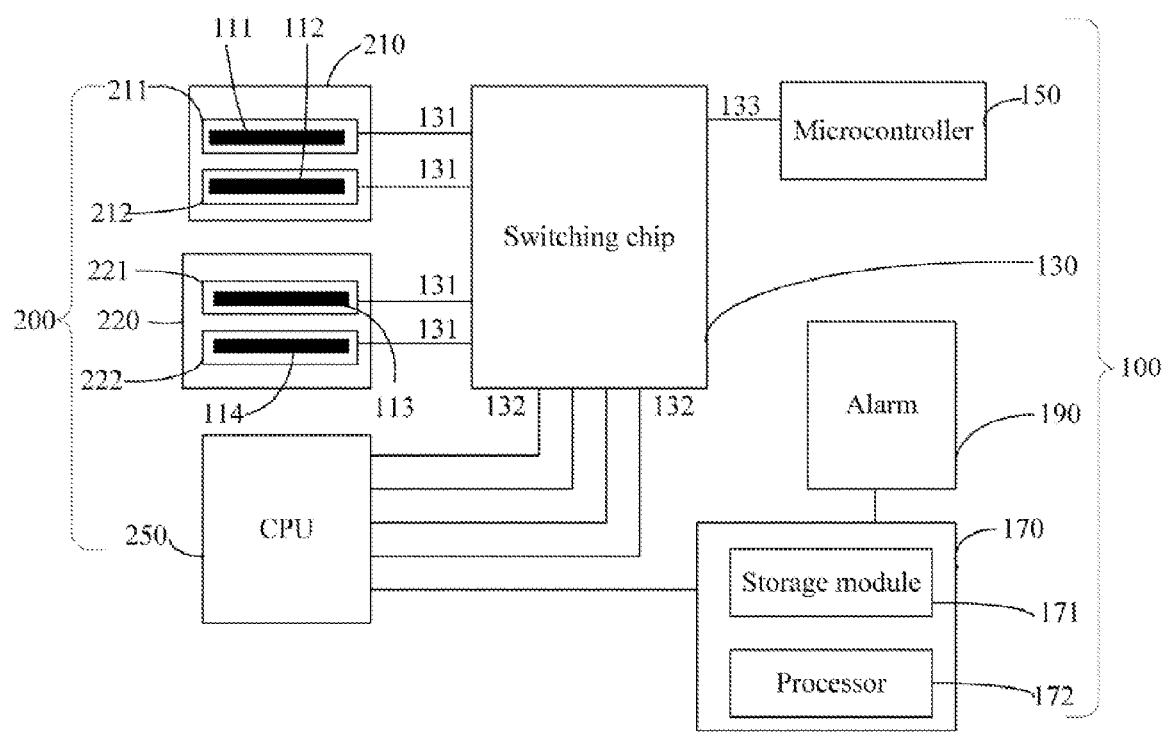
FIG. 1 is a schematic view of a motherboard testing device and a motherboard, according to a first embodiment.

FIG. 1 is a schematic view of a motherboard testing device 100 and a motherboard 200, according to a first embodiment. The motherboard 200 includes a first memory channel 210, a second memory channel 220, and a central processing unit (CPU) 250. The first memory channel 210 includes a first memory slot 211 and a second memory slot 212. The second memory channel 220 includes a third memory slot 221 and a fourth memory slot 222. The configuration of each of the four memory slots 211, 212, 221, and 222 is substantially the same. The total number of different combination modes of the four memory slots 211, 212, 221, and 222 is $C_4^1+C_4^2+C_4^3+C_4^4=15$.

The motherboard testing device 100 includes a first memory module 111, a second memory module 112, a third memory module 113, a fourth memory module 114, a switching chip 130, a microcontroller 150, a testing module 170, and an alarm 190.

The first memory module 111 is received in the first memory slot 211, the second memory module 112 is received in the second memory slot 212, the third memory module 113 is received in the third memory slot 221, and the fourth memory module 114 is received in the fourth memory slot 222. Each of the four memory modules 111, 112, 113, 114 has a number of working modes corresponding to the combination modes. The CPU 250 is used for controlling each of the four memory modules 111, 112, 113, and 114 to work in a correct working mode which is proper for the corresponding combination mode.

The switching chip 130 includes four input pins 131, four output pins 132 corresponding to the input pins 131, and a controlling pin 133. Each of the four input pins 131 is electrically connected to one of the four memory slots 211, 212, 221, and 222, the four output pins 132 are electrically connected to the CPU 250, and the controlling pin 133 is electrically connected to the microcontroller 150. In one embodiment, the switching chip 130 can be a baseboard management controller (BMC), and the mode of the switching chip 130 can be a PCA9517ADP model chip. The number of the input pins 131 and the number of the output pins 132 are not limited to this embodiment.

The microcontroller 150 forms a number of combination modes of the memory slots 211, 212, 221, and 222 by electrically combining the four memory slots 211, 212, 221, and 222, and gives a serial number to each combination mode. The microcontroller 150 further controls the memory slots which are included in a particular combination mode to electrically connect to the CPU 250, and controlling the other memory slots which are not included in the particular combination mode to disconnect from the CPU 250, by reference to the serial number.

In particular, if a particular combination mode includes the first memory slot 211 and the second memory slot 212, the microcontroller 150 controls the switching chip 130 to electrically connect both the two input pins 131 corresponding to the first memory slot 211 and the second memory slot 212, to the corresponding output pins 132. The microcontroller 150 further controls the switching chip 130 to electrically disconnect the two input pins 131 corresponding to the third memory slot 221 and the fourth memory slot 222, from the corresponding output pins 132.

The microcontroller 150 further powers the motherboard 100 on and off.

The testing module 170 is electrically connected to the CPU 250, and tests whether the CPU 250 controls the memory modules received in the memory slots included in each combination mode to work in the correct modes, and to determine whether the motherboard 200 is working normally. The testing module 170 further outputs a test result signal to the alarm 190. The test result signal indicates that the CPU 250 controls the memory modules received in the memory slots of each combination mode to work in the correct working modes. The testing module 170 includes a storage module 171 and a processor 172. The storage module 171 stores a known CPU testing program (such as a CPU testing program developed by the DELL Company), and the processor 172 executes the known CPU testing program.

The alarm 190 is activated when the testing module 170 determines that the CPU 250 is not working normally. The alarm 190 may be an audible buzzer or a visible light emitting diode (LED).

Figure 3:
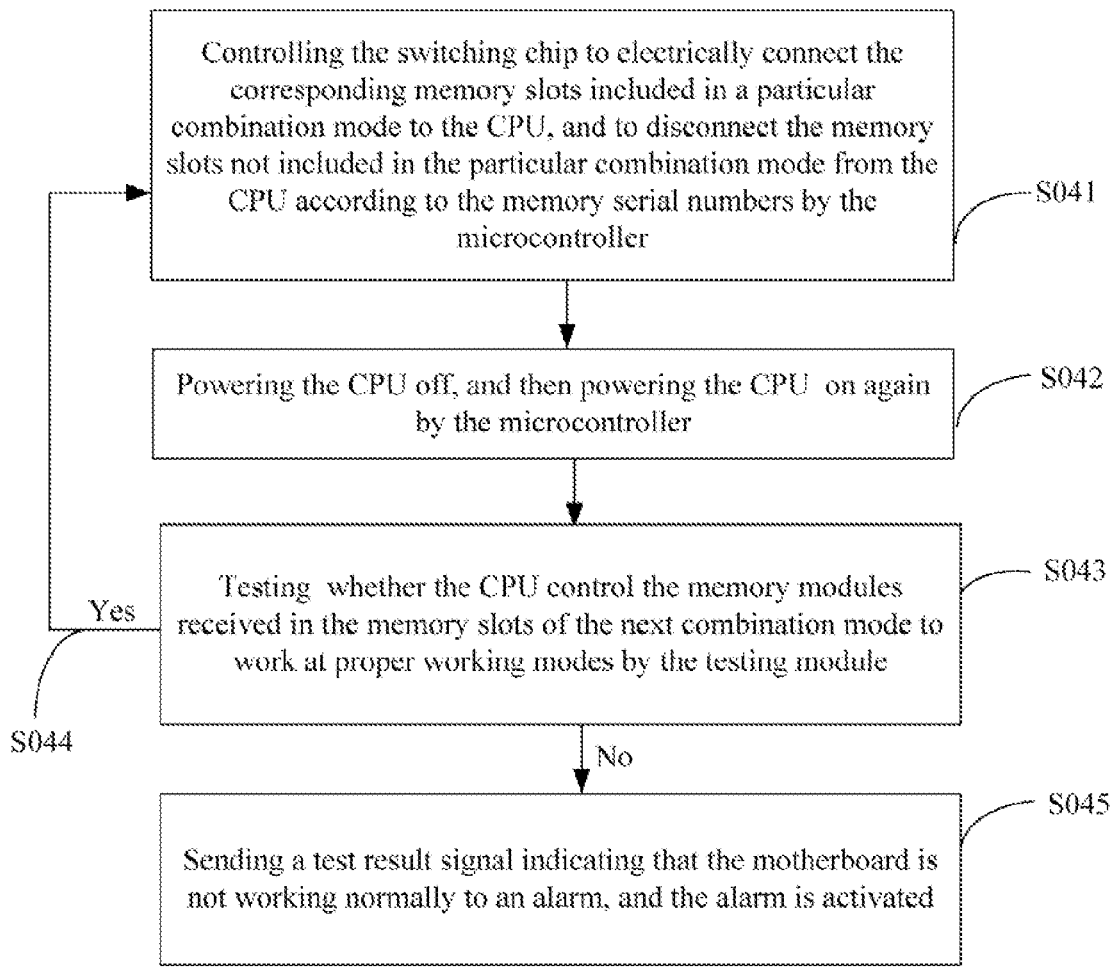
FIG. 3 is a schematic flowchart of step S04 of the motherboard testing method of FIG. 2.

Referring to FIGS. 2-3, a motherboard testing method, according to a second embodiment, is shown. The method includes the following steps (S).

In S01, a motherboard testing device 100 and a motherboard 200 are provided. In particular, the motherboard testing device 100 includes a first memory module 111, a second memory module 112, a third memory module 113, a fourth memory module 114, a switching chip 130, a microcontroller 150, a testing module 170, and an alarm 190. The motherboard 200 includes a first memory channel 210, a second memory channel 220, and a CPU 250. The first memory channel 210 includes a first memory slot 211 and a second memory slot 212. The second memory channel 220 includes a third memory slot 221 and a fourth memory slot 222.

In S02, the microcontroller 150 forms a plurality of combination modes of the four memory slots 211, 212, 221, and 222 by electrically combining the four memory slots 211, 212, 221, and 222, and gives a serial number to each combination mode. In this embodiment, the total number of different combination modes is $C_4^1+C_4^2+C_4^3+C_4^4=15$.

In S03, the first memory module 111 is received in the first memory slot 211, the second memory module 112 is received in the second memory slot 212, the third memory module 113 is received in the third memory slot 221, the fourth memory module 114 is received in the fourth memory slot 222. In another embodiment, the step S02 and the step S03 are interchangeable.

In S04, the microcontroller 150 outputs controlling commands to the switching chip 130 by reference to the serial numbers, to control each of the memory slots included in a particular combination mode to electrically connect to the CPU 250, and to disconnect the other memory slots not included in the particular combination mode from the CPU 250 according to the serial number. The testing module 170 tests whether the CPU 250 controls the memory modules received in the memory slots included in each combination mode to work at a correct work mode proper for the corresponding combination mode. If the CPU 250 controls the memory modules received in the memory slots of all of the combination modes to work at correct working modes, the testing module 170 determines that the motherboard 200 is acceptable. If the CPU 250 controls the memory modules received in the memory slots of at least one combination mode to work at wrong working modes, the testing module 170 determines that the motherboard 200 is defective.

In particular, the step S04 includes the following steps.

In S041, the microcontroller 150 controls the switching chip 130 to electrically connect the corresponding memory slots included in a particular combination mode to the CPU 250, and to disconnect the memory slots not included in the particular combination mode from the CPU 250, according to the serial numbers. When the CPU 250 receives no signals from a memory module received in a particular memory slot disconnected from the CPU 250, the CPU 250 determines that the particular memory slot does not receive a memory module.

In S042, the microcontroller 150 powers the CPU 130 off, and then powers the CPU 130 on again.

In S043, the testing module 170 tests whether the CPU 250 controls the memory modules received in the memory slots of a particular combination mode to work at the correct working modes.

In S044: if the testing module 170 tests the CPU 250 controls the memory modules received in the memory slots of the particular combination mode to work at the correct working modes, go back to S41 to test the next combination mode until all of the combination modes have been tested.

In S045: if the testing module 170 tests the CPU 250 does not control the memory modules received in the memory slots of the particular combination mode to work at the correct working modes, the testing module 170 sends a test result signal indicating that the CPU 250 is not working normally, and the alarm 190 is activated.

Each of the memory slots 211, 212, 221, and 222 receive a corresponding memory module 111, 112, 113, and 114 respectively, the switching chip 130 controls the memory slots 211, 212, 221, and 222 to electrically connect to or disconnect from the CPU 250, and thus the memory modules 111, 112, 113, and 114 received in the memory slots 211, 212, 221, and 222 can be electrically connected to or disconnected from the CPU 250. The four memory modules 111, 112, 113, and 114 do not need to be manhandled, either for insertion into a particular slot or for extraction from the particular slot. Thus, work efficiency is improved, and the gold fingers of the four memory modules 111, 112, 113, and 114 are not damaged by repeated physical operations.

In other embodiments, the numbers of the first memory channel 210 and the second memory channel 220 are not limited to the number described in this embodiment, and the numbers of the first memory slot 211, the second memory slot 212, the third memory slot 221, and the fourth memory slot 222 are similarly not limited.

In other embodiments, the number of the switching chip 130 is not limited to one only, so long as the microcontroller 150 can be electrically connected to the controlling pins 133 of all the switching chips 130, and controlling commands can be output to the controlling pins 133.

It will be understood that the above particular embodiments and methods are shown and described by way of illustration only. The principles and the features of the present disclosure may be employed in various and numerous embodiments thereof without departing from the scope of the disclosure as claimed. The above-described embodiments illustrate the scope of the disclosure but do not restrict the scope of the disclosure.

What is claimed is:

1. A motherboard testing device configured for testing a motherboard, wherein the motherboard comprises a first memory channel, a second memory channel, and a central processing unit (CPU), the first memory channel comprises a first slot and a second slot, the second memory channel comprises a third slot and a fourth slot; the motherboard testing device comprising:
   a first memory module received in the first memory slot;
   a second memory module received in the second memory slot;
   a third memory module received in the third memory slot;
   a fourth memory module received in the fourth memory slot;
   a switching chip comprising:
      a plurality of input pins respectively electrically to the first memory module, the second memory module, the third memory module, and the fourth memory module;
      a plurality of output pins corresponding to the input pins and electrically to the CPU; and
      a controlling pin;
   a microcontroller electrically connected to the controlling pin, and configured for forming a plurality of combination modes of the memory slots by electrically combining the four memory slots, and gives a serial number to each combination mode; the microcontroller further configured for controlling the switching chip to electrically connect the memory slots in a particular combination mode to the CPU, and to disconnect the other memory slots not in the particular combination mode from the CPU;

a testing module electrically connected to the CPU, and configured for testing whether the CPU control each of the memory modules received in the memory slots comprised in each combination mode to work at a correct work mode proper for the corresponding combination mode.

2. The motherboard testing device of claim 1, wherein the motherboard testing device further comprises an alarm configured for alarming when the testing module determines that the CPU is not working normally.

3. The motherboard testing device of claim 2, wherein the alarm is a buzzer or a light emitting diode.

4. The motherboard testing device of claim 1, wherein the microcontroller is further configured for powering the CPU off after the switching chip control the memory slots in a particular combination mode to electrically connect to the CPU, and then the microcontroller is further configured for powering the CPU on again.

5. The motherboard testing device of claim 1, wherein the switching chip is Baseboard Management Controller.

6. The motherboard testing device of claim 5, wherein the mode of the switching chip is a PCA9517ADP chip.

7. The motherboard testing device in claim 6, wherein the testing module comprises a storage module and a processor, the storage module stores a testing program, and the processor executes the testing program.

8. A motherboard testing method, comprising:
providing a motherboard testing device and a motherboard, the motherboard testing device comprises a first memory module, a second memory module, a third memory module, a fourth memory module, a switching chip, a microcontroller, and a testing module, the motherboard comprising a first memory channel, a second memory channel, and a CPU, wherein the first memory channel comprises a first memory slot and a second memory slot, the second memory channel comprises a third memory slot and a fourth memory slot;

forming a plurality of combination modes of the memory slots by electrically combining the first memory slot, the second memory slot, the third memory slot, and the fourth memory slot, and gives a serial number to each combination mode by the microcontroller;

inserting the first memory module in the first memory slot, inserting the second memory module in the second memory slot, inserting the third memory module in the third memory slot, and inserting the fourth memory module in the fourth memory slot;

controlling the switching chip to electrically connect the memory slots in a particular combination mode to the CPU, and to disconnect the other memory slots not in the particular combination mode from the CPU according to the serial number by the microcontroller, testing whether the CPU controls each of the memory modules received in the memory slots of the particular combination mode to work at a proper working mode by the testing module.

9. The motherboard testing method in claim 8, wherein after testing whether the CPU controls each of the memory modules received in the memory slots of the particular combination mode to work at a correct working mode by the testing module, the motherboard is powered off by the microcontroller, then the motherboard is power on again by the microcontroller.

10. The motherboard testing method in claim 8, wherein the testing module comprises a storage module and a processor, the storage module stores a testing program, and the processor executes the testing program.

11. The motherboard testing method in claim 8, wherein the motherboard testing device further comprises an alarm, and the step of determining the motherboard is defective further comprises sending a test result signal indicating that the CPU is not working normally to the alarm, and the alarm is activated.

12. The motherboard testing method in claim 11, wherein the alarm is a buzzer or a light emitting diode.

13. The motherboard testing method in claim 11, wherein the switching chip is Baseboard Management Controller.

14. The motherboard testing method in claim 13, wherein the mode of the switching chip is a PCA9517ADP chip.

* * * * *